United States Patent Office 3,032,532
Patented May 1, 1962

3,032,532
ACYLOXY-ENDBLOCKED DIORGANO-POLYSILOXANES
Leonard B. Bruner, Madison, Wis., assignor to Dow Corning Corporation, Midland, Mich., a corporation of Michigan
No Drawing. Filed Nov. 9, 1959, Ser. No. 851,518
2 Claims. (Cl. 260—46.5)

This invention relates to acyloxy-endblocked diorganopolysiloxane compositions useful as intermediates in the preparation of fluids and rubber-grade gums and to a novel method for the preparation of such compositons.

This invention relates specifically to a composition of the formula $AcO(SiR_2O)_nAc$ in which each R is an organic radical selected from the group consisting of monovalent hydrocarbon radicals and halogenated monovalent hydrocarbon radicals, each Ac is a saturated aliphatic monoacyl radical of less than four carbon atoms and $n$ is a positive integer greater than nine.

In the compositions of this invention each Ac group can be the formyl, acetyl or propionyl radical. Each R can be any monovalent hydrocarbon radical such as alkyl radicals such as methyl, ethyl, butyl, tertiary-butyl, octadecyl and myricyl; any alkenyl radical such as vinyl, allyl or hexenyl; any cycloaliphatic hydrocarbon radical such as cyclohexyl, cyclopentyl, cyclohexenyl and cyclobutyl; any alkaryl hydrocarbon radical such as benzyl or β-phenylethyl and any aromatic hydrocarbon radical such as phenyl, tolyl, xylyl, naphthyl, xenyl and phenanthryl, R can also be any halogenated monovalent hydrocarbon radical such as chloromethyl, pentafluorobutyl, trifluorovinyl chlorophenyl, bromophenyl, α,α,α-trifluorotolyl, bromoxenyl, chlorotrifluorocyclobutyl, chlorocyclohexyl and iodophenyl.

For the purpose of this invention the polymer size of the compositions can vary from thin fluids where $n$ has a value of 10 to non-flowing gums where $n$ has a value of 10,000 or more. Where $n$ is less than 10, hydrolysis of the acyloxy-endblocked polymers tends to form some cyclic materials which are undesirable.

There are two preferred methods for preparing the compositions of this invention. One method is fully described in my recently-filed copending application Serial Number 842,586, filed September 28, 1959, and entitled "Diorganopolysiloxane Polymerization." This method involves the reaction of a hydroxy-endblocked polymer of the formula $HO(SiR_2O)_{m_1}H$ with a diacyloxy compound of the formula $AcO(SiR_2O)_{m_2}Ac$, where R and Ac are as above defined and $m_1$ and $m_2$ are each positive integers, in a mol ratio of 1 to 2 to produce a polymer of the formula $AcO(SiR_2O)_{m_2}(SiR_2O)_{m_1}(SiR_2O)_{m_2}OAc$ where the sum of $m_2+m_1+m_2=n$. This reaction can be stimulated with heat or can be catalyzed using at least 0.1 percent by weight based on the weight of the reactants of a non-ionic nitrogen base having a dissociation constant of at least $10^{-10}$, e.g. tetramethylguanidine or 1,4-bisdimethylaminobutane, or carboxylic acid salt of such a base.

The other method for preparing the compositions of this invention involves the reaction of an organosiloxane with acetic anhydride with or without a catalyst. More specifically, this method comprises reacting at a temperature above 50° C. (1) an organosiloxane compound having attached to each silicon atom from 2 to 3 organic radicals selected from the group consisting of monovalent hydrocarbon radicals and halogenated monovalent hydrocarbon radicals and (2) at least one mol per mol of (1) of acetic anhydride, whereby the product has a degree of polymerization less than that of (1). The organic radicals are more specifically defined above as R.

The organosiloxane compound (1) can be a hexaorganodisiloxane or a linear diorganopolysiloxane endblocked wth organic radicals or hydrolyzable radicals such as OAc radicals, OH radicals, halogen atoms or hydrocarbonoxy radicals. Where hydrolyzable radicals other than OAc are present, they are replaced by OAc radicals to form some of the claimed compositions

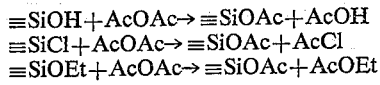

$\equiv SiOH + AcOAc \rightarrow \equiv SiOAc + AcOH$
$\equiv SiCl + AcOAc \rightarrow \equiv SiOAc + AcCl$
$\equiv SiOEt + AcOAc \rightarrow \equiv SiOAc + AcOEt$ Subsequently, reactions by the method of this invention break down the siloxane linkages of (1) and form other acyloxy-endblocked polysiloxanes claimed in this invention.

The mol ratio of acetic anhydride to compound (1) determines the amount of molecular size reduction which takes place. The mechanism of this reaction is apparently:

$\equiv SiOSi \equiv + AcOAc \rightarrow 2 \equiv SiOAc$

It is evident from this reaction that the composition produced must have a lower degree of polymerization, i.e. fewer siloxane units per molecule, than the original organosiloxane compound.

The method of this invention requires heat. There is negligible reaction at less than 50° C. Generally, this method is ideally run at reflux temperatures, but higher temperatures can be used with pressure if desired. Mutual solvents such as toluene, xylene and methylisobutylketone can be present if desired.

While no catalyst is necessary, the method of this invention proceeds more efficiently in the presence of a boron triacetate catalyst present in an amount equal to at least 0.5 percent by weight of the reacting components. There is no critical maximum amount of catalyst although the use of more than 25 percent by weight produces handling problems. Preferably, the boron triacetate should be present in an amount ranging from 3 to 10 percent by weight based on the weight of the reacting components to achieve the best results.

The claimed method is useful not only in producing the claimed compositions of this invention without undesired siloxane bond rearrangement but in salvaging polysiloxane rubber stocks by providing a means of breaking down a cured polymer or a high molecular weight gum into usable fluid and gum components.

The compositions of this invention are useful as intermediates in the preparation of organic end-blocked fluids or high molecular weight cyclic-free polymeric gums of predetermined molecular structure by the method described in my aforementioned copending application:

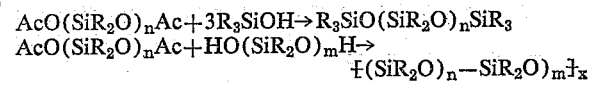

$AcO(SiR_2O)_nAc + 3R_3SiOH \rightarrow R_3SiO(SiR_2O)_nSiR_3$
$AcO(SiR_2O)_nAc + HO(SiR_2O)_mH \rightarrow$
$\quad \{(SiR_2O)_n - SiR_2O)_m\}_x$ The following examples are merely illustrative and are not intended to limit this invention which is properly delineated in the claims. All viscosities were measured at 25° C. The symbols Me, Ph and Vi represent the methyl, phenyl and vinyl radicals respectively.

*Example 1*

10 grams of $B_2O_3$ and 350 grams of acetic anhydride were heated until the solid phase had disappeared showing the production of boron triacetate. 228.3 grams of hexamethyldisiloxane were then added. The system was refluxed for 72 hours. The reaction product was diluted with cyclohexane, filtered, washed with cyclohexane and fractionated. The product was

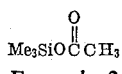

Example 2

8.75 grams of a 5310 cs. hydroxy-endblocked dimethylpolysiloxane, 3.0 grams of octamethylcyclotetrasiloxane as a solvent-purging agent, 0.5 gram of pyridine and 0.5 gram of methylvinyldiacetoxysilane were mixed and heated for 75 minutes at 75° C. The product was stripped and found to be a fluid made up of molecules of the average formula

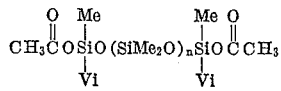

in which $n$ was approximately 400.

Example 3

4.82 grams of a 58,800 cps. hydroxy-endblocked 3,3,3-trifluoropropylmethylpolysiloxane, 1.00 gram of pyridine and 1.00 gram of methylvinyldiacetoxysilane were mixed and heated for 3 hours at 70° C. The stripped product was a viscous fluid made up of molecules of the average formula

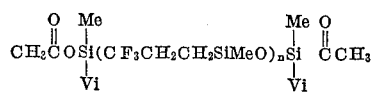

in which $n$ was approximately 142.

Example 4

The following hydroxy-endblocked dimethylpolysiloxanes were mixed with acetic anhydride in amounts greatly in exces of 2 mols of acetic anhydride per mol of dimethylpolysiloxane. Pyridine was added to accelerate the reaction of the silicon-bonded hydroxyl groups with the acetic anhydride. Each mixture was heated for 63.5 hours at 110° C. producing acetoxy-endblocked dimethylpolysiloxanes of the viscosities shown corresponding to the following average values of $n$ in the formula $$AcO(SiMe_2O)_nAc$$

| Siloxane Reactant | | Siloxane Product | |
|---|---|---|---|
| Viscosity (cs.) | Av. $n$ | Viscosity (cs.) | Av. $n$ |
| 560,000 | 1,540 | 220,000 | 1,240 |
| 16,700 | 609 | 5,210 | 419 |
| 2,060 | 297 | 1,162 | 234 |
| 524 | 166 | 392 | 145 |

Example 5

Several mixtures were made up consisting of 120 grams of 100 cs. trimethylsiloxy-endblocked fluid copolymer of 10 mol percent phenylmethylsiloxane units and 90 mol percent dimethylsiloxane units, 4.9 grams of pyridine and 5.4 grams of acetic anhydride. These mixtures were heated together for the times shown at about 110° C. and allowed to cool after which they were twice rinsed with octamethylcyclotetrasiloxane and stripped at up to 140° C. and 0.2 mm. Hg. The samples were then titrated for silicon-bonded acetoxy content.

Time (hrs.): AcO (percent by wt.)
2 ------------------------------------ 0.0600
5 ------------------------------------ 0.0622
16 ----------------------------------- 0.0760
23.5 --------------------------------- 0.0870

Example 6

6.53 grams of acetic anhydride were mixed with 100 grams of a high molecular weight hydroxy-endblocked 3,3,3-trifluoropropylmethylpolysiloxane gum. The sample was heated 16 hours at 110° C. and 72 hours at 150° C. The sample was vacuum stripped for 16 hours at about 80 to 100° C. at 1 mm. Hg. The final viscosity of the product was 7850 cps. Titration of the acetoxy groups in the product showed the product to have the average formula

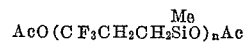

where $n$ has an average value of 58.1

Example 7

When a hydroxy-endblocked copolymer having an average degree of polymerization of approximately 420 and composed of 65 mol percent dimethylsiloxane units, 30 mol percent chlorophenylmethylsiloxane units, 3 mol percent dibenzylsiloxane units and 2 mol percent octadecylmethylsiloxane units is substituted mol per mol for the hydroxy-endblocked dimethylpolysiloxane in Example 2, the resulting product is approximately

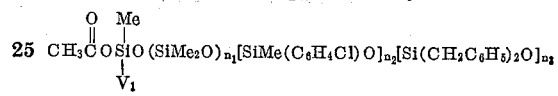

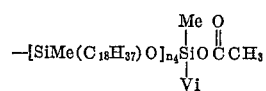

wherein $n_1$, $n_2$, $n_3$ and $n_4$ have the average values 273, 126, 12.6 and 8.4 respectively.

Example 8

When phenylmethyldipropionoxysilane is substituted mol per mol for the methylvinyldiacetoxysilane in Example 2, the product is a fluid made up of molecules of the average formula

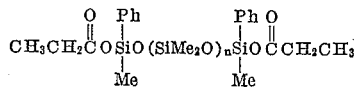

in which $n$ is approximately 400.

That which is claimed is:

1. A composition of the formula $AcO(SiR_2O)_nAc$ in which each R is an organic radical selected from the group consisting of monovalent hydrocarbon radicals and halogenated monovalent hydrocarbon radicals, each Ac is a saturated aliphatic monoacyl radical of less than four carbon atoms derived from a carboxylic acid and $n$ is a positive integer greater than nine.

2. A method comprising reacting at a temperature above 50° C. (1) an organosiloxane compound having attached to each silicon atom from 2 to 3 organic radicals selected from the group consisting of monovalent hydrocarbon radicals and halogenated monovalent hydrocarbon radicals and (2) at least one mol per mol of (1) of acetic anhydride in contact with (3) at least 0.5 percent by weight based on the total weight of (1) and (2) of boron triacetate whereby the product has a degree of polymerization less than that of (1).

References Cited in the file of this patent
UNITED STATES PATENTS 2,811,506    Constan ------------------ Oct. 29, 1957
2,910,496    Bailey et al. ------------- Oct. 27, 1959

OTHER REFERENCES

Henglein et al.: Makromol. Chem., vol. 15, pp. 177–187 (1955).

UNITED STATES PATENT OFFICE
CERTIFICATE OF CORRECTION

Patent No. 3,032,532                                              May 1, 1962

Leonard B. Bruner

It is hereby certified that error appears in the above numbered patent requiring correction and that the said Letters Patent should read as corrected below.

Column 2, line 56, left-hand portion of the formula, for "$AcO(SiR_2O)_n Ac + 3R_3 SiOH \rightarrow$" read -- $AcO(SiR_2O)_n Ac + 2R_3 SiOH \rightarrow$ -- line 58, for the formula "$[(SiR_2O)_n - SiR_2O)_m]_x$" read -- $[(SiR_2O)_n - (SiR_2O)_m]_x$ --.

Signed and sealed this 20th day of November 1962.

(SEAL)
Attest:

ERNEST W. SWIDER                                                 DAVID L. LADD
Attesting Officer                                                    Commissioner of Patents